United States Patent Office 3,532,746
Patented Oct. 6, 1970

3,532,746
TWO STAGE OXIDATION
George Ember, Palisades Park, N.J., assignor to Standard Oil Company, Chicago, Ill., a corporation of Indiana
No Drawing. Filed Sept. 20, 1966, Ser. No. 580,612
Int. Cl. C07c 63/02
U.S. Cl. 260—524    4 Claims

ABSTRACT OF THE DISCLOSURE

This invention relates to the preparation of certain aromatic polycarboxylic acids by catalytic liquid phase oxidation of methyl substituted aromatic hydrocarbon precursors of said aromatic polycarboxylic acid with molecular oxygen and gases containing molecular oxygen and more particularly pertains to the preparation by a novel two catalytic stage liquid phase oxidation of aromatic acids having two or more pairs of carboxylic acid groups each of which are attached to vicinal aromatic ring carbons providing each of said COOH group pairs with the acid anhydride ring forming function.

---

It has been discovered that in the catalytic liquid phase oxidation of aromatic hydrocarbons having pairs of methyl group substituents on vicinal aromatic ring carbon atoms such as two methyl groups each on two different vicinal benzene ring carbons or each on the 1,8-carbons of naphthalene or each on two different other vicinal ring carbons of naphthalene such as 1,2-, or 2,3- or 3,4-, or each on 2,2' carbons of biphenyl or on vicinal carbons of the same benzene ring of biphenyl, or other aromatic hydrocarbons having pairs of similarly situated methyl groups, there is a limiting factor on the complete conversion of all methyl group substituents by oxidation to carboxylic acid groups. This limitation on the complete conversion of methyl groups can occur by the auto-inhibitive nature of one of the pairs of methyl substituents in the above noted position situations, by an oxidative free radical dimerization, by partial oxidation under oxygen starvation oxidation conditions (not only less than but also the oxygen required by the stoichiometry) and by combinations thereof.

Oxygen starvation conditions can be overcome by increasing the input of molecular oxygen but without other controls the increased oxygen concentration aids free radical oxidative dimerization. Oxidation temperatures of certain magnitudes found to be useful for promoting high rates of oxidation of methyl substituted aromatics having no pairs of methyls on vicinal ring carbons or similarly situated carbons i.e., m- and p-xylene, 1,3,5-trimethylbenzene, 3,3'-dimethylbiphenyl, 3,3',5,5'-tetramethylbiphenyl, 1,3-dimethyl naphthalene, 1,3,5,7-tetramethyl naphthalene and the like promote oxidative-inhibition and/or free radical oxidative dimerization of the aforementioned methyl substituted aromatic hydrocarbons having pairs of methyl groups substituted on ring carbons providing acid anhydride ring formation function. It is not the formation of the acid anhydride ring fused to the aromatic ring which causes the less than all methyl group oxidation factor. Rather it is the close proximity of pairs of methyl groups in the relationship which provides for their resulting carboxylic acid groups the possible acid anhydride ring formation function.

The less than all conversion of methyl groups by molecular oxygen oxidation to carboxylic acid groups limiting factor appear as a ceiling limitation in the range of 40 to 70 mole percent yield on the production of aromatic polycarboxylic acids wherein all the pairs of methyl group substituents are converted to carboxylic acid substituents on the aromatic rings. The remaining 60 to 30 mole percent of starting polymethyl aromatic hydrocargon is partially converted to mono- and even di-methyl substituted aromatics and oxidative dimers which cannot be further oxidized to the desired aromatic polycarboxylic acid even where more severe recycle oxidation conditions are used than used in the initial oxidation. The free radical oxidative dimer products are for example like methyl and carboxy substituted benzil whose diketo bridge is exceedingly refractory. The catalytic liquid phase oxidation of o-xylene, pseudocumene and durene with molecular oxygen have been observed to produce benzil, methyl substituted benzils, carboxy substituted benzils among other free radical oxidative dimers. The methyl carboxylic acids resulting from the catalytic liquid phase oxidations of o-xylene, pseudocumene, durene, 2,3-dimethyl naphthalene, 2,3,5,6-tetramethyl naphthalene, 2,3-dimethylbiphenyl, 2,2',4,4'-tetramethylbiphenyl, 2,2'-dimethylbiphenyl, 2,3,4-trimethylbiphenyl and the like can be o-toluic acid, 2-methyl-terephthalic acid, 1-methyl-isophthalic acid, dimethyl benzoic acids, 5-methyl-trimellitic acid, 2-methyl-trimellitic acid, 2,5-dimethyl-terephthalic acid, monomethyl naphthoic acids, monomethyl naphthalene tricarboxylic acids, dimethyl naphthalene dicarboxylic acids, 2-methylbiphenyl - 3 - carboxylic acid, 2-methylbiphenyl-2,4,4'-tricarboxylic acid 2,4-dimethyl-biphenyl-2',4' - dicarboxylic acid, 2-methylbiphenyl - 2' - dicarboxylic acid and the like.

For the catalytic liquid phase oxidation of o-xylene, pseudocumene, dimethyl naphthalenes with the methyls on vicinal ring carbons or similarly situated so the two resulting COOH substituents can form naphthalic anhydride, and similar substituted dimethylbiphenyls with molecular oxygen, e.g. air, there has been devised two means for oxidation control either of which provides substantially complete oxidation of all ring substituted methyls to COOH groups. One or both are effective for the foregoing di- and trimethyl substituted benzenes, dimethyl naphthalenes, 2,2'-dimethylbiphenyl, bis-(2,3- or 3,4-dimethyl) biphenyls. Those two oxidation control methods are successfully used with systems of catalysis which employ one or more heavy metal oxidation catalysts with a side chain free radical and/or oxidation initiator. In one of the oxidation control techniques the aromatic hydrocarbon, solvent and catalyst system components are combined in the oxidation zone together and the molecular oxygen source such as air or commercial oxygen is introduced at a temperature near but slightly above the oxidation potential threshold temperature (oxidation threshold energy level) and at a rate to provide unused (about 2 to 5%) oxygen in the gases exhausted from the oxidation zone, that is an excess of oxygen over that being consumed at the starting temperature and the rate of oxidation is kept substantially constant by progressively increasing reaction temperature and pressure while maintaining said condition of unused (2 to 5% oxygen) in the exhaust gas by adjustment of molecular oxygen input. This technique not only provides substantially complete conversion of all the methyl groups to COOH groups but surprisingly also provides a shorter overall reaction than starting at and maintaining a higher reaction temperature.

The second technique employs a delayed introduction of one heavy metal oxidation catalyst where two or more heavy metal oxidation catalysts of substantially different oxidation potential are used as components of the catalysis system. According to this second technique, the heavy metal oxidation catalyst of highest oxidation potential is added with the side chain free radical and/or oxidation initiator to the aromatic hydrocarbon and reaction solvent and the resulting mixture is oxidized at a temperature to give a high oxidation rate with molecular oxygen introduction rate to provide 2 to 5% unused oxygen in the exhaust gas from the oxidation zone where a liquid phase of solvent or solvent and aromatic is maintained. Thereafter during the later portion of the oxidation, i.e., after 0.6 to 0.8 of the total oxygen to satisfy the stoichiometry of the reaction has been introduced, the heavy metal of substantially lower oxidation potential is introduced with or without an additional amount of said side chain free radical and/or oxidation initiator. This second technique also breaks through the apparent mole yield ceiling limiting factors. This is also surprising for when the liquid phase catalytic oxidation is conducted by providing a combination of high oxidation energy potential (high reaction temperature) and high oxidation catalytic potential, the mole yield ceiling limiting factors operate against substantially complete conversion of all methyl substituents to COOH substituents. It would appear better to try combinations of low heat energy oxidation potential and low catalytic oxidation potential to control and/or eliminate the observed causes of mole yield ceiling limiting factors. However, it is surprising that the use of moderate to medium heat energy oxidation potential can be combined with the highest of catalytic oxidation potential initially followed by a later introduction of a lower catalytic oxidation potential component to achieve the breakthrough of mole yield ceiling limiting factors.

The two foregoing techniques, the subject of copending applications do not provide the ultimate solution for the catalytic liquid phase oxidation of all methyl groups on aromatic hydrocarbon having two or more pairs of methyl groups wherein each methyl pair are substituents on vicinal ring carbons or ring carbons so spaced as to provide acid anhydride formation for each of two pairs of resulting carboxylic acid groups. Illustrative of such compounds are 1,2,3,4-tetramethylbenzene (prehnitol), 1,2,4,5 - tetramethylbenzene, (durene), pentamethylbenzene, hexamethylbenzene, 2,3,5,6 - tetramethylbiphenyl, 2,2′,4,5 - tetramethylbiphenyl, 2,2′,6,6′ - tetramethylbiphenyl, bis(2,3,5,6-tetramethyl)biphenyl bis(pentamethyl) biphenyl 2,3,6,7-tetramethyl naphthalene, 1,4,5,8-tetramethyl naphthalene, pentamethyl naphthalenes, hexamethyl naphthalenes, heptamethyl naphthalenes, octamethyl naphthalenes, and other polymethyl substituted fused and joined polyaromatic ring hydrocarbons. It is most desirable to be able to obtain high yields of aromatic tetracarboxylic acids having two pair of carboxylic acid groups so situated on one benzene ring or on two or more fused rings or two or more joined rings (as in biphenyl) so that each carboxylic acid group of one pair is in a para-type orientation with each carboxylic acid group of another pair and that each pair is so ring position situated on an aromatic ring as to be capable of acid anhydride formation. For example, the production of pyromellitic acid (1,2,4,5-benzene tetracarboxylic acid), 1,4,5,8-naphthalene tetracarboxylic acid, bis(2,3,4-tricarboxy) biphenyl and the like, are exceptionally desirable because ridged, highly thermal resistant, high melting derivatives such as polyimides and polyamides substantially aromatic chain in nature and polyesters can be prepared from those aromatic tetra- and higher polycarboxylic acids and their intra-molecular polyanhydrides.

A novel technique has been discovered for the catalytic liquid phase oxidation of substantially all methyl groups to carboxylic acid groups of said aromatic hydrocarbons having two or more pairs of methyl group substituents with each pair on vicinal ring carbons or on ring carbons so ring position situated as to provide acid anhydride ring formation function with molecular oxygen or gas mixture having molecular oxygen as a component. The novel technique of this invention comprises a two catalytic stage liquid phase oxidation wherein the first catalytic stage employs one or more heavy or transition metals having an oxidation potential, as measured by EMF, above $-1.5$ that is in the range of $-1.5$ to $-2.0$ together with a side chain free radical and/or oxidation initiator at a moderate to medium heat energy oxidation potential and using molecular oxygen as the oxidant in an amount or at a rate to provide 2 to 5% oxygen by volume in the gasiform mixture from the oxidation zone, maintaining a constant oxidation rate by progressively increasing oxidation heat energy potential (increasing reaction temperature) and increasing reaction pressure until 0.75 to 0.9 of the theoretical oxygen for conversion of all methyl groups to COOH groups has been introduced, and thereafter finishing the oxidation by the introduction of a catalytic amount of a material having an oxidation catalytic effect but an oxidation potential of from $-1.0$ to $-0.5$ and preferably a compound providing NO radicals. Molecular oxygen is still used as the oxidant in the second catalytic stage and in the amount or rate to provide in the gasiform mixture from the oxidation zone 2 to 5% oxygen by volume.

The catalytic amount of NO radical providing compound can expressed as equivalent to that provided by 0.2 to 1.0 weight percent of the total weight of initial oxidation mixture of hydrocarbon and solvent. As sources of NO radical there can be used dilute aqueous nitric acid, concentrated nitric acid (50 to 100% $HNO_3$), inorganic nitrites such as ammonium nitrite, sodium nitrite, potassium nitrite, calcium nitrite, barium nitrite, nitrites of metals having atomic numbers of from 23 to 98 and inorganic nitrates such as ammonium nitrate, sodium nitrate, calcium nitrate, barium nitrate and nitrates of metals of atomic number of from 23 to 98. The NO radical has an oxidation potential of about $-1.0$. Here again it is surprising that one can achieve substantially complete oxidation of all methyl groups by the use of a much lower catalytic oxidation potential catalyst when the use of catalysts having higher catalytic oxidation potential such as in the range of $-1.2$ to $-2.0$ cannot produce complete oxidation of substantially all methyl groups of the class of methyl substituted aromatic hydrocarbons hereinbefore defined as starting materials for the technique of this invention.

For example, the 3- to 5-hour batchwise catalytic liquid phase oxidation of durene with air at 250 to 450° F. in the presence of cobalt (oxidation potential of $-1.8$) and manganese (oxidation potential of $-1.5$) and a side chain free radical or oxidation initiator and acetic acid as solvent results in the production of 40 to 50 mole percent pyromellitic acid, 20 to 30 mole percent methyl benzene tricarboxylic acid and the remaining 40 to 20 mole percent being free radical dimers polymethyl phthalic and benzoic acids and even unoxidized durene. However, by the oxidation of durene in acetic acid solvent with air in the presence of heavy metal or transition metal catalyst having an oxidation potential in the range of $-1.5$ to $-2.0$, but above $-1.5$, and in the presence of the same side chain free radical or oxidation initiator starting at 220 to 250° F. and progressively increasing the reaction temperature to 450° F. to maintain a constant oxidation rate and also increasing pressure to maintain liquid phase conditions while continuing to supply air to provide 2 to 5 volume percent oxygen in the exhaust gas, then adding say nitric acid in an amount to provide 0.2 to 1.0 weight percent of the original charge to the oxidation zone and continuing the use of air at 450° F. there results substantially complete oxidation of all four methyl groups of durene to COOH groups and less than 5 mole percent of methylbenzene tricarboxylic acids in a batch reaction of 60 to 80 minutes.

The novel technique of this invention is applicable to catalytic liquid phase oxidations of the class of aromatic hydrocarbons having at least four methyl substituents arranged in pairs as hereinbefore described in processes conducted batchwise and continuous where there is no back mixing between the second catalytic stage and the first catalytic stage such as in oxidations conducted with plug flow in tubular reaction vessels. In such continuous oxidations the source of molecular oxygen can be added with the solvent first stage catalyst components and aromatic hydrocarbon to be oxidized at one end of the tubular or pipe line reactor and the second stage catalyst components added down stream. Additional molecular oxygen can be added, if desirable not to supply all the oxygen at the charging end of the tubular or pipe line reactor, at a point or points down stream of the charging end. The slurry or solution of aromatic polycarboxylic acid, is of course, discharged from the tubular or pipe line reactor at the end opposite the charging end.

The batchwise reaction can be conducted in one or two tank type reaction vessels with or without mechanical mixing. Where two reaction vessels are employed, the entire contents of the first is discharged into the second vessel after 0.75 to 0.9 of the theoretical oxygen has been added to the first vessel reaction. The second stage catalyst NO providing component can be added to the second vessel as a separate stream or added to the effluent from the first vessel as it flows into the second vessel. Where mechanical mixing such as provided by propeller, turbine, etc. stirring devices is not used, the manner in which molecular oxygen, especially in air, is added can provide mixing in the tank type reaction vessel or vessels. For batchwise operation in tank type reaction vessels the provision of a substantially homogeneous reaction mixture advantageously provides higher yields, more uniform and rapid reaction rates and less partially oxidized methyl groups (such as oxidation to methylol or formyl groups) over quiescent or mildly mixed non-homogeneously reaction media. However, the two catalytic stage techniques of this invention even in those reactions where a homogeneous reaction media is not provided can be used to advantage over the single stage catalysis in the same nonhomogeneous media.

Catalytic liquid phase oxidations of aromatic hydrocarbons with molecular oxygen as oxidant are generally conducted at temperatures above 100° F., in the range of 100 to 530° F., in an oxidation zone at a pressure to maintain a liquid phase of the reaction media, solvent and/or aromatic hydrocarbon being oxidized. The aromatic hydrocarbon to be oxidized, a solvent inert to oxidation and the catalyst are charged to the oxidation vessel and either heated therein under pressure to maintain a liquid phase in the oxidation zone or preheated and charged at oxidation temperature and the pressure to maintain liquid phase conditions in the oxidation zone. Thereafter a source of molecular oxygen is introduced into the liquid phase in the oxidation zone such as by injecting pressurized air, commercial oxygen or mixtures of oxygen and inert gas such as nitrogen or air enriched with oxygen having oxygen contents between 20% and 100% oxygen by volume. Where inert gas is introduced with oxygen, it is desirable to remove the inert gas from the oxidation vessel substantially free from condensables as an exhaust gas.

The oxidations conducted in the presence of efficient catalyst systems are exothermic and thus do not require input of external heat as long as the oxidation produces sufficient heat to compensate for radiant and conductant heat losses. Usually more heat is produced than said heat losses and removal of heat of reaction becomes necessary to control the reaction temperature. Excess heat of reaction can be readily removed by cooling a gasiform mixture generated from the oxidation zone to condense substantially all of any vapors of aromatic hydrocarbon being oxidized or partial oxidation products thereof and solvent vapors and return the condensate to the oxidation zone. In the cases where the solvent does not vaporize under the conditions of reaction temperature and pressure in the oxidation zone, the liquid reaction mixture can be continuously withdrawn from the oxidation zone and externally cooled, for example by indirect heat exchange with a coolant such as water, and the cooled liquid pumped back into the oxidation zone and injected into the liquid phase therein as the sole or partial means for providing a stirred homogeneous reaction mixture.

As inert solvents there can be used benzene and halogenated benzenes such as bromobenzene, o-dichlorobenzene, lower saturated aliphatic monocarboxylic acids of 2 to 8 carbon atoms and especially acetic acid, propionic acid and butyric acid, benzoic acid, o-phthalic acid and mixtures thereof such as mixtures of acetic acid or benzoic acid or o-phthalic acid with one or more of benzene and halogenated benzenes. Such inert solvents can be suitably from 10 to 85%, preferably from 30 to 80%, by weight of the reaction mixture. The amount of solvent is not critical for the oxidation reaction or conducting the oxidation. The preferred concentration of solvent, 30 to 80% of the reaction mixture, is based mainly on engineering and process handling considerations and to some extent on keeping in solution oxidation byproduct impurities having chemical and/or physical properties close to those of the desired aromatic polycarboxylic acid product. The choice of solvent, as long as it is inert to the oxidation conditions, is not critical. Where benzoic acid is the sole solvent or a component of the solvent of choice, toluene can be added initially or from time to time for it will be oxidized to benzoic acid. Hence when a benzoic acid-benzene or benzoic acid-benzene-halogenated benzene solvent system is of choice, commercial mixtures of benzene and toluene can be used as source of benzene component and part or all of the benzoic acid component of such solvent systems.

The first stage system of catalysis as hereinbefore defined for the novel oxidation technique of this invention employs one or more heavy or transition metal oxidation catalyst having an oxidation potential (as measured by EMF) of more than $-1.5$ and in the range of $-1.5$ to $-2.0$. In the sense of magnitude of numbers $-2.0$ is not above $-1.5$. But in the EMF measurement of oxidation potential, an oxidation potential of $-2.0$ is higher than $-1.5$ and $-1.0$ is lower than $-1.5$. Certain of the heavy metals or transition metals (heavy or transition metals) having an atomic number of from 23 to 98, have oxidation potentials in the range of $-1.5$ to $-2.0$ especially in changing from their highest oxidation state to a lower oxidation state. For example cobaltic to cobaltous is $-1.8$, ceric to cerous is $-1.6$ and manganic to manganous is $-1.5$. Other of the heavy or transition metals have oxidation potentials of below $-1.5$ but above $-1.0$ when going from their highest to a lower oxidation state. In oxidation reaction the heavy or transition metals seldom, if ever, go to metallic state. The preferred heavy or transition metals for the first stage catalysis of the novel oxidation technique of this invention are cobalt and cerium and combinations thereof, although others of oxidation potential in the range of $-1.5$ to $-2.0$ but above $-1.5$ can be used to the same advantage. Preference of cobalt and cerium and combinations thereof are based on the commercial availability of these metals and their salts soluble in water or in the solvent system employed in the oxidation or in the aromatic compound being oxidized. These heavy or transition metals of oxidation potential in the range of $-1.5$ to $-2.0$ but above $-1.5$ can be added as metals when the metals are soluble in the solvent system for example through reaction with the acid component of the solvent system with or without the presence of oxygen to form the salt of metal corresponding to the acid, or those metals can be added as inorganic acid salts or salts of organic acids or as metal-organic complexes soluble in water or the oxidation solvent medium as is well known to the catalytic liquid phase oxidation art. Adding initially the heavy or transition metal initially as a nitrate does not produce the mole yield limiting factor of catalyst component of oxidation potential of $-1.5$ or below because any NO formed in the first catalytic stage does not have this effect and is generally swept out when purging non-condensables as exhaust gas from the gasiform mixture generated from the oxidation zone.

As the side chain free radical and/or oxidation initiator there can be employed acetaldehyde or its polymer paraldehyde, methyl ethyl ketone and other methyl ketones, or a form of bromine. A form of bromine is preferred because it provides with the heavy or transition metals of oxidation potential in the range of −1.5 to −2.0 but above −1.5 higher reaction rates thus shorter reaction periods and is not consumed during oxidation or oxidized to a different chemical entity and hence, bromine is used in only catalytic quantities. Such is not the case when acetaldehyde or paraldehyde and methyl ethyl ketone are employed with heavy metal oxidation catalysts. The form of bromine used is not critical. Bromine can be added as elemental bromine; ionic bromine such as HBr, hydrobromic acid, ammonium bromide, sodium bromide, potassium bromide, potassium bromate, even as the bromides of the heavy or transition metal of oxidation potential in the range of −1.5 to −2.0 but above 1.5; or as combined bromine as in organic bromides such as tetrabromoethane, benzyl bromide, bromobenzenes and the like. No claim is herein made to the oxidation systems of catalysis provided by the use of heavy or transition metal oxidation catalysis in combination with acetaldehyde (or its polymer form), or methyl ketones such as methyl ethyl ketones or a form of bromine. These systems of catalysis were first disclosed in U.S. Pat. No. 2,245,528 (transition metals with acetaldehyde or methylethyl ketone) and U.S. Pat. No. 2,833,816 (heavy metal oxidation catalysts with a form of bromine) as being useful in the liquid phase oxidation of aromatic compounds with molecular oxygen to aromatic acids. However, the selection of particular combinations of heavy or transition metal of oxidation potential in the range of −1.5 to −2.0 but above −1.5 with a side chain free radical and/or oxidation initiator for use in the first catalytic oxidation stage is one element of the present invention. The preferred form of this element are combinations of a form of bromine with cobalt, or cerium or mixtures of cobalt and cerium. Because of the relatively low initial oxidation temperature a mixture of ionic and combined forms of bromine is preferred.

The second element of this invention is the selection of conditions for conducting the first catalytic oxidation stage. The source of molecular oxygen, e.g. air, is injected into the liquid phase in the oxidation zone beginning at about 200 to 275° F., preferably 220 to 250° F. when durene is being oxidized to pyromellitic acid. The initial pressure in the oxidation zone for all solvent systems is that equivalent to at least maintain acetic acid in the liquid phase at 200 to 275° F. and is preferably in the range of 50 to 150 pounds per square inch gauge pressure especially when air is the source of the molecular oxygen oxidant. Those initial pressure conditions are selected for the first catalytic oxidation stage for all solvent systems to provide a uniform oxygen concentration in the liquid phase in the oxidation zone. The initial pressure can be readily determined when sources of molecular oxygen having an oxygen content greater than 20 to 22% by volume by taking into account the pressure required to maintain a liquid phase in the oxidation zone and the greater oxygen content in the molecular oxygen source so that substantially the same oxygen concentration is initially present as when air is used. Air, the preferred source of molecular oxygen, is injected under pressure in an amount or rate to bring about oxidation at 200 to 275° F. and provide about 2 to 5% oxygen by volume on a condensable free basis in the gasiform mixture (mixture of nitrogen, oxygen, oxides of carbon, water vapor, vapors of solvent components and vapors or aromatic hydrocarbons). Said 2 to 5 volume percent oxygen on a condensable free basis is then the oxygen present in the portion of the gasiform mixture remaining after at least vapors of solvent components and aromatic hydrocarbons and a substantial portion have been condensed and removed. This oxygen content can be readily determined by taking a sample of said gasiform mixture through a trap at 190 to 200° F. (90 to 100° C.) and then injecting the remaining mixture of vapors and gases into a device for measuring oxygen. Then the reaction temperature is progressively increased to 400 to 480° F. necessitating progressive increase of pressure to maintain liquid phase conditions and amount of oxygen injection increased or decreased as required to maintain a constant oxidation rate and provide the 2 to 5 volume percent oxygen, condensable free basis, in said gasiform mixture to maintain a constant rate of oxidation which can be measured by heat of reaction per unit of time, e.g. B.t.u./hr., or by the measurement of byproduct water per unit of time or by any other means known to those skilled in this art. Completion of the first catalytic oxidation stage is determined by the injection of source of molecular oxygen in an amount to provide 0.75 to 0.95 of the theoretical oxygen necessary to oxidize all methyl groups to COOH groups. In the case of oxidizing durene (4-methyl group to 4 COOH groups) the theoretical amount of oxygen is 6 moles per mole of durene being oxidized and thus the first catalytic oxidation stage is complete at 450° F. for durene when 4.5 to 4.8 moles of oxygen have been injected.

The third element of this invention is provided by the addition of an oxidation catalyst having an oxidation potential of −1.0 to −0.5 in catalytic amounts to the liquid phase produced by the first catalytic oxidation stage. Here the use of substances providing NO is preferred and the amount of NO providing substance to be used is that equivalent to the use of aqueous nitric acid containing 60–63% $HNO_3$ by weight in an amount of 0.3 to 1.0 percent of the weight of solvent and aromatic hydrocarbon to be oxidized charged to the first catalytic oxidation stage. When calculated on this basis, one need not measure the weight of the liquid phase at the end of the first catalytic oxidation stage. Thus the preferred catalyst system for the second catalytic oxidation stage is NO and bromine in combination with cobalt, or cerium or mixtures of cobalt and cerium. It will be noted that when aqueous 60–63% nitric acid is added to the second catalytic oxidation stage to provide the NO component of the catalyst system there is from 1.0 to 0.8 mole equivalent of unoxidized methyl group in the oxidation of durene. Assuming the initial use of one mole durene and 4 parts solvent per weight part durene initially to give about 670 weight parts of original charge, then 0.9% $HNO_3$ is added (about 10.1 weight parts of 60% $HNO_3$) there will be about .096 mole $HNO_3$ added and this represents 0.096 to 0.12 mole $HNO_3$ per mole of unoxidized methyl group. Such a mole ratio of $HNO_3$ (or NO) to mole of —$CH_3$ is too low to provide complete oxidation of the remaining 0.8 to 1.0 mole unoxidized methyl group. Thus the nitric acid or NO plays no significant role as oxidizing agent but rather does function as catalyst component. The injection of molecular oxygen is continued in the second catalytic oxidation stage to provide the 2 to 5 volume percent excess of oxygen on the basis hereinbefore described. As further evidence that the catalytic amount of NO present when provided by nitric acid is not the oxidant, an increase in oxygen consumption with air injection is noted as soon as the small, catalytic amount of $HNO_3$ is added. The final oxidation temperature can be as high as 530° F.

The amounts of source of bromine and heavy or transition metal of oxidation potential in the range of −1.5 to −2.0 but above −1.5 used in the first catalytic oxidation stage follows the teachings in U.S. Pat. No. 2,833,-816. That is the total metals are employed suitably in the range of 0.1 to 10 percent, desirably 0.3 to 2.0 percent and preferably 0.5 to 1.7 percent, by weight based on the aromatic hydrocarbon being oxidized. The source of bromine provides about 1 to 10 atoms of bromine per atom total metal and preferably 0.2 to 0.5 of the bromine is charged as ionic bromine and the remaining 0.8 to 0.5 is charged as combined or organic bromine.

With particular regard to the catalytic liquid phase oxidation of durene (1,2,4,5-dimethylbenzene) with air, reaction conditions favoring the formation of monomethyl-substituted benzene tricarboxylic acids appear adversely to effect the formation of pyromellitic acid. That is monomethyl substituted benzene tricarboxylic acid reaction products have an autoinhibitory effect on the complete oxidation to pyromellitic acid. When the reaction mixture contains about 30 to 45 weight percent monomethyl substituted benzene tricarboxylic acids on a solvent and hydrocarbon free basis, the pyrolmellitic acid product will be, on the same basis, in the range of 5 to 40 weight percent. Illustrative of such results are the following oxidations of durene with air in the presence of acetic acid as oxidation solvent and using the indicated heavy metal oxidation catalysts and bromine. Two different modes of conducting catalytic liquid phase oxidation are employed: Non-stirred vertical-tube and stirred-tank. The non-stirred vertical tube reactor is a 1 inch (I.D.) by 72 inches long, sealed titanium tube having external side-wall means for heating or cooilng the contents, a bottom-valved conduit for introducing air, a bottom discharge valved conduit, a valved-charging conduit, a condenser, a vapor transfer conduit from the top of the tube to said condenser, a condensate receiver with a transfer conduit thereto from the condenser and a condensate reflux conduit back to the tube reactor, pressure regulator (adjustable), a gas transfer conduit from the vapor space in the condensate receiver to the pressure regulator and an exhaust gas conduit to transfer gases away from the pressure regulator. The vertical tube reactor is charged with durene, acetic acid and catalyst and the charging valve is closed. The air in the reactor is displaced with nitrogen and the pressure regulator is set for the required pressure to maintain a liquid phase at the initial reaction temperature. The contents of the tube reactor are heated to the initial reaction temperature and thereafter pressurized air is injected into the liquid phase in the tube reactor and external heating is stopped. As reaction temperature is increased with reaction pressure increase by adjustment of the pressure regulator. Conventionally for tri and tetra-methyl substituted benzenes reaction pressure and temperature are increased after about the theoretical amount of oxygen for oxidizing the first, second, third and fourth methyl group has been introduced to provide increased additional oxidation severity for the oxidation of the second, third and fourth methyl group. Some unreacted oxygen is discharged with nitrogen, oxides of carbon which form mainly from the oxidation of solvent and water vapor not condensed in the condenser. The oxygen content of such discharged gasiform mixture corresponds to 1 to 5% by volume as measured on a solvent free basis of the gasiform mixture going to the condenser. Two such comparative oxidations of durene are shown in Table I where the oxidation temperature range, solvent ratio (weight ratio of acetic acid to durene) reaction time, catalyst component concentration (weight percent) in acetic acid, and the composition of the reaction mixture total solids (solids remaining after evaporation of unoxidized hydrocarbon, solvent and any byproduct water also byproducts of similar volatilities) are shown.

TABLE I.—COMPARATIVE CONVENTIONAL DURENE OXIDATION NON-STIRRED TUBE REACTOR

|  | I | II |
|---|---|---|
| Comparative temperature range, ° F | 220–475 | 250–465 |
| Solvent ratio | 5.0 | 5.0 |
| Reaction time, minutes | 70 | 40 |
| Catalyst components, wt. percent: | | |
| CO | 0.058 | 0.045 |
| Ce | 0.40 | 0.20 |
| Br | 0.95 | 0.34 |
| Total solids, wt. percent: | | |
| Diacids and methyl diacids | 0.16 | 1.60 |
| Higher than diacids and methyl diacids | 0.97 | 5.4 |
| Trimellitic acid | 1.55 | 4.77 |
| After trimellitic acid | 1.21 | 5.72 |
| Methyl triacids | 36.8 | 44.8 |
| After methyl triacids | 0.48 | 2.68 |
| Products before PMA | 5.71 | 7.24 |
| Pyromellitic acid (PMA) | 25.0 | 0.0 |
| PMA, anhydride | 5.5 | 13.0 |
| Reducibles: hydroxy and/or aldehydic | 4.1 | 3.9 |

In Comparative I the total pyromellitic acid product (acid and anhydride converted to acid) is 31.6 weight percent and in Comparative II the total pyromellitic acid product is 15.2.

In the use of a stirred tank reactor a stirred 4 gallon capacity titanium tank is used fitted with the same auxiliary apparatus as described for the nonstirred tube reactor. The stirring device for this stirred tank type reactor is of the variable speed type. The charging and conduit of the oxidation is the same as for the non-stirred tube. Stirring at 1080 revolutions per minute (r.p.m.) is used. Comparative III durene oxidation is conducted the same as Comparative I and II durene oxidations except that when reaction temperature of 460° F. is reached, additional catalyst components dissolved in acetic acid are added. The oxidation conditions and composition of the total solids residue of the reaction mixture are shown in Table II.

TABLE II

Comparative III durene oxidation—Stirred tank

| | |
|---|---|
| Reaction temperature range | 280–460 |
| Solvent ratio | 5.4 |
| Reaction time—minutes | 110 |
| Catalyst components—wt. percent initial: | |
| CO | 0.034 |
| Ce | 0.10 |
| Br | 0.166 |
| Additional catalyst components: | |
| CO | 0.017 |
| Mn | 0.008 |
| Ce | 0.057 |
| Br | 0.058 |
| Total solids—wt. percent: | |
| Diacids and methyl diacids | 0 |
| Higher than diacids and methyl diacids | 18.3 |
| Trimellitic acid | 5.35 |
| After trimellitic acid | 4.52 |
| Methyl triacids | 39.1 |
| After methyl triacids | 2.97 |
| Products before PMA | 0 |
| Pyromellitic acid (PMA) | 0 |
| PMA—anhydride | 5.4 |
| Reducibles: hydroxy and/or aldehydic | 9.5 |
| Volatiles | 5.6 |

In Comparative III the second addition of catalyst components was made at 450–460° F.

The novel oxidation technique of this invention applicable to the oxidation of aromatic hydrocarbons having two or more pairs of methyl group substituents with each pair on vicinal ring carbons is hereinafter illustrated by application to durene (1,2,4,5-tetramethylbenzene) using cobalt and cerium as transition metals having oxidation potential above −1.5 in the first oxidation stage with bromine as the side chain free radical or oxidation initiator and using in the second oxidation stage, in addition to transition metals and bromine, a catalytic amount of sodium nitrite and/or nitric acid to provide catalyst of from −1.0 to −0.5 oxidation potential. Acetic acid with 3 to 5% water by weight is the reaction solvent. Examples 1 and 2 are conducted in a nonstirred vertical 1 inch by 72 inches tube reactor and Examples 3 to 5 are conducted in a stirred tank (4 gallon) reactor before described. The operating conditions for Examples 1 through 4 are shown in Table III and the compositions of total solids residue of the reaction mixture resulting from Examples 1 through 5 are shown in Table IV. In all of Examples 1 through 5 air is used as the source of molecular oxygen and the air injection into the liquid phase in the oxidation reactor is adjusted as need be to provide unreacted oxygen of 2 to 5 volume percent on an acetic acid free basis in the gasiform mixture evolving from the oxidation zone. The catalyst components for the second oxidation stage are added as a solution in acetic acid (3 to 5% water) at or within 10° F. of the highest shown oxidation temperature.

TABLE III.—OXIDATION CONDITIONS

|  | Example 1 | Example 2 | Example 3 | Example 4 | Example 5 |
|---|---|---|---|---|---|
| Temperature range, °F | 430–470 | 220–475 | 280–465 | 280–465 | 280–465 |
| Solvent weight ratio | 7.4 | 7.0 | 6.0 | 6.0 | 6.0 |
| Reaction time, minutes | 70 | 90 | 155 | 147 | 127 |
| First stage catalyst wt. percent on solvent: |  |  |  |  |  |
| Co | 0.018 | 0.085 | 0.031 | 0.031 | 0.031 |
| Mn | 0 | 0.045 | 0 | 0 | 0 |
| Ce | 0 | 0.25 | 0.09 | 0.09 | 0.09 |
| Br | 0.10 | 0.45 | 0.15 | 0.15 | 0.15 |
| Second stage catalyst wt. percent on solvent: |  |  |  |  |  |
| Co | 0.04 | 0.135 | 0 | 0 | 0 |
| Mn | 0 | 0 | 0.024 | 0.024 | 0.024 |
| Ce | 0.06 | 0 | 0 | 0 | 0 |
| Br | 0.22 | 0.53 | 0.1 | 0 | 0.1 |
| $HNO_3$ | 1.2 | 0.90 | 1.7 | 1.7 | 1.7 |
| $NaNO_2$ | 1.0 | 0 | 0 | 0 | 0 |

TABLE IV.—TOTAL SOLIDS COMPOSITION

| Solids components: | Example 1 | Example 2 | Example 3 | Example 4 | Example 5 |
|---|---|---|---|---|---|
| Trimellitic acid | 0.56 | 2.27 | 6.32 | 6.08 | 5.05 |
| Methyl triacids | 0.28 | 1.74 | 2.19 | 1.17 | 8.68 |
| Higher than methyl triacids | 0.0 | 0.0 | 0.48 | 0.20 | 0.2 |
| Before PMA | 0.0 | 0.0 | 0.39 | 0.31 | 3.41 |
| Pyromellitic acid (PMA) | 64.7 | 69.5 | 66.6 | 69.8 | 59.9 |
| PMA-anhydride | 0 | 0 | 10.4 | 11.7 | 14.7 |
| Reducibles: alcohol and/or aldehydic acids | 5.0 | 3.0 | 1.9 | 2.3 | 2.0 |

In contrast to the comparative oxidations, the oxidations of Examples 1 through 4 produced no dibasic acids, methyl dibasic acids, or compounds between said dibasic acids and trimellitic acid, or compounds between trimellitic acid and methyl tribasic acids. The total pyromellitic acid product equivalent present: pyromellitic acid plus PMA anhydride converted to the acid, in the total solids of Examples 1 through 5 are as follows:

| Example: | PMA product— weight percent |
|---|---|
| 1 | 64.7 |
| 2 | 69.5 |
| 3 | 77.9 |
| 4 | 77.4 |
| 5 | 83.7 |

The trimellitic acid in the total solids results in part from some 1,2,4-trimethylbenzene in the durene and in part from mono-decarboxylation of pyromellitic acid at 460–475° F. The total solids products of Examples 1 through 5 can be processed to recover pyromellitic acid anhydride substantially free of the oxidation byproducts. For example heating the total solids in the presence of durene to a temperature at about which PMA-anhydride forms to form an azeotropic mixture with water, filtering the hot solution to remove metal salts and then cooling the durene solution to about 200–300° F. to precipitate acid products not forming anyhydrides, and then pyromellitic anhydride and trimellitic anhydride, more soluble in durene than the nonanhydride forming acids, can be recovered by crystallization at 25–120° F. or by distilling off durene say at atmospheric pressure and at about 395 to 415° F. Such a technique is described in U.S. Pat. No. 3,007,942. It is to be noted that the foregoing total solids compositions do not account for metals nor do they account for volatile components lost during drying and hence do not represent 100% of the solids in the mixture resulting from the oxidation.

Another manner for conducting the two stage oxidation technique of this invention in commercial practice is through the use of three series connected oxidation vessels. In such an oxidation durene and an acetic acid solution of the first oxidation stage catalyst components preheated to 200 to 275° F., preferably 220 to 250° F. are charged to the first oxidation vessel operated at 100 p.s.i.g. concurrently with air at a rate of air to durene to provide 2 to 5% oxygen by volume (acetic acid free basis) in the gasiform mixture generated from the liquid phase of reaction mixture. The durene retention time in the first oxidation vessel is equivalent to about the injection of about 2 to 3 moles of oxygen per mole of durene charged. Thereafter the liquid phase reaction mixture is pumped into the second oxidation vessel operated at 400 to 500 p.s.i.g. pressure and 450 to 480° F. through a preheater heating the reaction mixture taken from the first oxidation vessel at say 250° F. to 425 to 450° F. Pressurized air also is simultaneously injected into the liquid phase in this second vessel related to the durene equivalent charged and to provide 2 to 5% oxygen by volume, on acetic acid free basis, in the gasiform mixture generated from the liquid phase reaction mixture. After a retention time in this second oxidation vessel equal to the injection of additional air to provide 2.5 to 1.8 moles more of oxygen (total of 4.5 to 4.8 moles oxygen in first two vessels) per mole originally charged durene. Then the reaction mixture is pumped from the second oxidation vessel to the third vessel operated at 450 to 480° F. and 450 to 500 p.s.i.g. and the second stage catalyst components dissolved in acetic acid are pumped into the charging transfer line of the third oxidation vessel. Air flow into the liquid phase in the third vessel is adjusted to maintain the same 2 to 5% oxygen by volume. Pyromellitic acid is recovered from the liquid effluent from the third oxidation vessel. By addition of anhydrous acetic acid to the third oxidation vessel with the second stage oxidation catalyst components and transferring the gasiform mixture generated from the liquid phase in the third oxidation vessel to the liquid phase in the second oxidation vessel, the gasiform mixture generated from the liquid phase in the second oxidation vessel to the liquid phase in the first oxidation vessel condensing the gasiform mixture generated from the liquid phase in the first oxidation vessel and separating from said condensate unreacted durene and returning it to the first oxidation vessel only the aqueous acetic acid condensate from said first vessel need be processed to remove byproduct water and the liquid effluent from the third oxidation vessel will have a sufficiently low water content that the acetic acid recovered therefrom can be reused by recycle to the first oxidation stage without subjecting it to dehydration.

No novelty is claimed for such a series connected three oxidation vessel system each operated batchwise or all in a continuous system or the counter current flow of acetic acid values from the last vessel to the first vessel to have substantially anhydrous oxidation conditions in the last oxidation zone. Such a series connected system of oxidation vessels and the use of counter current flow of acetic acid are now known to those acquainted with this catalytic liquid phase air oxidation art.

A more specific illustration of the foregoing using the two stage oxidation catalyst system of this invention is described in Example 6.

EXAMPLE 6

To the first of three series connected oxidation vessels operated as hereinbefore described there is charged 28 pounds durene and 1270 pounds acetic acid containing 3% water by weight and containing dissolved cobalt and cerium acetates and a mixture of sodium bromide and tetra-bromethane to provide the following concentrations of $Co^{++}$, $Ce^{++}$ and $Br^-$ based on the acetic acid:

| | Weight percent |
|---|---|
| $Co^{++}$ | 0.03 |
| $Ce^{++}$ | 0.09 |
| $Br^-$ | 0.15 |

The resulting acetic acid solution is heated to 250° F. at 65 p.s.i.g. External heating is stopped without further application of external heating, air is introduced slowly until the liquid phase in the oxidation zone reaches 280° F. at which time durene is pumped in at the rate of 8 pounds per minute, air input is maintained to provide 3% oxygen by volume (acetic acid free basis) in the gasiform mixture from the liquid phase and the oxidation temperature is permitted to increase gradually to about 345–350° F. at 65 p.s.i.g. Excess heat of reaction is removed through an overhead condenser which recycles condensate, wet acetic acid to the oxidation zone. In 30 minutes of durene introduction 240 pounds additional durene is added for a total of 268 pounds. Addition of durene is stopped and 5 minutes thereafter the liquid phase reaction mixture is pumped through a preheater to the second oxidation vessel whose pressure regulator is set at 400 p.s.i.g. The preheater raises the temperature of the liquid reaction mixture to about 425° F.

After about 10% of the liquid phase mixture from the first vessel enters the second vessel air is injected therein at a rate higher than that for the first vessel but no higher than to maintain 2 to 3% oxygen by volume on acetic acid free basis in the generated gasiform mixture. All of the liquid phase mixture is pumped into the second oxidation vessel in about 20 minutes. The oxidation in the second vessel is maintained at 460–465° F. After the air injection in the second vessel has provided oxygen to an amount to total with that injected in the first oxidation vessel to total 9.2 to 9.6 moles, the liquid phase mixture in the second oxidation vessel is pumped rapidly into the third oxidation vessel containing 138 pounds of acetic acid (3% water) containing dissolved tetra-bromoethane and nitric acid to provide the concentrations based on total acetic acid (1408 pounds) of: $Br^-$: 0.10 Weight percent, and $HNO_3$: 1.8 weight percent.

Air enriched with oxygen to provide a 30% oxygen by volume feed is injected into the third oxidation vessel operated at 460–465° F. and 400 p.s.i.g. The reaction mixture is held in this third vessel 15 to 25 minutes to provide a total oxidation time of about 80 to 90 minutes.

Thereafter the resulting liquid phase is discharged to a holding vessel from which the reaction mixture is charged to simple distillation for removal of about 85% of the acetic acid. To the residue is added about 250 pounds of durene, this mixture is heated to remove the remaining acetic acid, the acetic acid free mixture is heated at about 450° F. while distilling off a durene-water azeotropic mixture to remove water split out during acid anhydride, mainly pyromellitic acid anhydride and trimellitic acid anhydride, formation. The resulting residue is filtered at 200–220° F. to remove metal products. The filtrate is cooled to 110 to 120° F. and filtered to remove crystallized acid products. The second filtrate is distilled to recover durene. The residue from the durene recovery is fractionated at reduced pressure about 400 mm. Hg to remove trimellitic acid anhydride and then pyromellitic acid anhydride is recovered as a condensate.

What is claimed is:

1. A method of preparing aromatic polycarboxylic acids having at least four carboxylic acid groups as nuclear substituents arranged in at least two vicinal pairs, which method comprises oxidizing in an oxidation zone in the presence of an inert solvent an aromatic hydrocarbon having at least four methyl groups as nuclear substituents space arranged as said carboxylic acid substituents with molecular oxygen wherein a liquid phase of at least said solvent is maintained in said oxidation zone in the presence of two catalytic stage conditions whose first catalytic stage condition comprises bromine and a heavy metal oxidation catalyst having an oxidation potential in the range of −1.5 to −2.0 but above −1.5 and a starting temperature of from 200 to 275° F. and substantially constant oxidation rate is maintained in said first stage up to a temperature of 400 to 480° F. and said second catalytic stage condition is conducted after 0.75 to 0.95 the theoretical oxygen to oxidize all methyl groups has been supplied and comprises in addition to bromine and heavy metal oxidation catalyst of said first stage a catalytic amount of an oxidation catalyst providing NO having an oxidation potential of −1.0 to −0.5 selected from nitric acid and inorganic nitrates and nitrites and a temperature of at least 400° F. and up to 530° F., in each of said catalytic stages molecular oxygen is introduced to maintain in the gasiform mixture generated from said oxidation zone from 2 to 5 percent by volume of oxygen on a condensable free basis.

2. The method of claim 1 wherein 1 to 10 parts acetic acid per part of said aromatic hydrocarbon on a weight basis comprises the inert solvent.

3. A method of oxidizing durene with air to pyromellitic acid in the presence of 3 to 8 weight parts of acetic acid per part of durene in an oxidation zone wherein a liquid phase of at least acetic acid is maintained which method comprises charging air to said oxidation zone having durene and acetic acid in said weight proportions and a catalyst system consisting of bromine and a heavy metal oxidation catalyst having an oxidation potential of −1.5 to −2.0 but above −1.5 at initial temperature in the range of 200 to 275° F. and air is injected in an amount to provide 2 to 5 volume percent oxygen on an acetic acid free basis in the gasiform mixture generated from said oxidation zone, maintaining a substantially constant rate of oxidation while increasing the temperature and pressure progressively in said oxidation zone to a temperature in the range of 400 to 450° F. and still maintaining said amount of oxygen in said gasiform mixture until from 0.75 to 0.95 of the theoretical amount of oxygen required to oxidize all four methyl groups of durene to carboxylic acid groups has been supplied and thereafter adding to said oxidation zone a catalytic amount of an oxidation catalyst providing NO having an oxidation potential of −1.0 to −0.5 selected from nitric acid and inorganic nitrates and nitrites and continuing the oxidation at a temperature in the range of 400 to 530° F., maintaining a liquid phase of at least acetic acid in said oxidation zone, and adding air to said oxidation zone to provide at least said amount of oxygen in said gasiform mixture until the oxidation is substantially complete.

4. The method of claim 3 wherein nitric acid is the compound added to provide the catalytic amount of NO.

References Cited

UNITED STATES PATENTS 2,970,169    8/1955    Friedlander et al. _____ 260—524
3,089,906    5/1963    Saffer et al. _____ 260—524

LORRAINE A. WEINBERGER, Primary Examiner

R. S. WEISSBERG, Assistant Examiner